US006398094B1

(12) United States Patent
Alexander

(10) Patent No.: US 6,398,094 B1
(45) Date of Patent: Jun. 4, 2002

(54) WEB THREADING APPARATUS FOR A ROTARY PRINTING PRESS

(75) Inventor: John Jay Alexander, Middleton, MD (US)

(73) Assignee: The Washington Post, Washington, DC (US)

( * ) Notice: Subject to any disclaimer, the term of this patent is extended or adjusted under 35 U.S.C. 154(b) by 0 days.

(21) Appl. No.: 09/567,104

(22) Filed: May 8, 2000

(51) Int. Cl.[7] ............................ G03B 1/56; B41F 13/54

(52) U.S. Cl. .......................................... 226/92; 101/228

(58) Field of Search ..................... 226/91, 92; 101/227, 101/228

(56) References Cited

U.S. PATENT DOCUMENTS

| | | | | |
|---|---|---|---|---|
| 4,370,927 A | | 2/1983 | Fischer | 101/228 |
| 4,404,907 A | * | 9/1983 | Köbler et al. | 101/228 |
| 4,480,801 A | * | 11/1984 | Stone | 226/92 X |
| 4,706,862 A | | 11/1987 | Theilacker | 226/92 |
| 4,747,254 A | | 5/1988 | Lancaster | 53/556 |
| 5,052,295 A | | 10/1991 | Suzuki et al. | 101/227 |
| 5,201,269 A | * | 4/1993 | Eckert | 101/228 |
| 5,263,414 A | | 11/1993 | Lehrrieder et al. | 101/228 |
| 5,320,039 A | * | 6/1994 | Reponty et al. | 101/228 |
| 5,400,940 A | | 3/1995 | Sato et al. | 226/92 |
| 5,581,908 A | * | 12/1996 | Theilacker | 226/92 X |
| 5,816,465 A | * | 10/1998 | Suzuki | 226/92 |
| 5,967,036 A | * | 10/1999 | Marmin et al. | 226/92 X |
| 5,996,873 A | | 12/1999 | Pimpis | 226/92 |

* cited by examiner

*Primary Examiner*—Michael R. Mansen
(74) *Attorney, Agent, or Firm*—Sterne, Kessler, Goldstein & Fox PLLC

(57) ABSTRACT

A snake apparatus for threading a web through a printing press includes a body portion and a ridge integrally formed on a surface of the body portion. The ridge is configured to engage and guide the snake along a track through the printing press. Intermittent gaps are located in the ridge to allow the snake to flex. The snake is attached to an end of a web roll, and inserted into the track to guide the web through the press in the path desired.

20 Claims, 5 Drawing Sheets

WEB THREADING APPARATUS FOR A ROTARY PRINTING PRESS

BACKGROUND OF THE INVENTION

1. Field of the Invention

The present invention relates generally to a device used for threading a web of material through a rotary printing press.

2. Related Art

Rotary printing presses typically require that a paper web be threaded through the press each time a new paper roll is to be used. Presses typically require long lengths of paper, and the paper path is generally circuitous. Thus, threading paper through such a press can be a tricky and cumbersome procedure.

Devices, commonly referred to as "snakes," have been developed for threading the web around guide rollers and turning bars in the press. In use, the end of the web is connected to the snake, and the snake leads the web through the printing press. The snakes are made to run along tracks, shaped and curved to match the desired web path. When guided along such a track, a snake must be flexible enough to achieve the tight turns and bends required by the web path.

Typically, snakes have been made from chains, ropes or thin pieces of compliant materials, pushed and pulled along the web path by rollers or other powered devices. One common type of snake is made of a chain, which is advanced along a track by sprockets. However, use of chains is difficult, dirty, and the chain links are apt to break. Further, a chain can come off a sprocket or out of the track, requiring maintenance, during which time that portion of the press is not operational.

Another known snake includes riveted guides attached directly through the snake body. The snake relies on the guides to maintain the snake in the track. With this type of snake, the riveted guides run inside the track, directing the snake through the desired web path. However, a snake with riveted guides is unreliable, as the riveted guides may break in the track or may become disconnected from the snake, jamming the track and requiring instant maintenance during which time that portion of the press is not operational. Further, maintenance of the snake itself is difficult and cumbersome, as replacement rivets must be manually attached to the snake.

Another snake device, shown in U.S. Pat. No. 5,996,873, runs externally on a track and is comprised of a number of individual segments, joined using bosses retained by holes. The segments rotate along the track path so that the snake can follow any helical path which may be required to lead the web through the angle bars, around the guide rollers or through other parts of the printing press. A snake comprised of individual segments requires maintenance for each segment. The inter-working pieces are subject to binding and other problems which may result in difficulties with threading the web and can lead to maintenance and repairs during which time that portion of the press is not operational.

Another snake device, shown in U.S. Pat. No. 5,400,940, is a single element snake used for threading a web through a printing press. The snake is a thin member having either transverse grooves or through holes for meshing with sprockets to propel the snake through the system. Such a snake is required to be completely enclosed within the track system, except at the sprocket access points, to avoid the problem of the snake inadvertently separating from the track during use. As such, the snake is virtually inaccessible and any problem associated with the snake while threading a web would result in the press being out of operation. Also, if the sprockets do not mesh properly with the grooves or though holes, the press must be shut down and the snake realigned.

Therefore, what is needed is a snake for threading a web through a printing press that is reliable, has minimal parts that will not uncouple and lodge in the track or press, and that is easily accessible as maintenance is required.

SUMMARY OF THE INVENTION

The present invention smoothly and efficiently threads a web through a printing press, while avoiding costly maintenance and press downtime. Specifically, the invention is directed to a snake apparatus for threading a web through a printing press. The snake is comprised of a body portion and at least one ridge integrally formed on at least one surface of the body portion. The ridge extends the length of the body and is configured to engage and guide the snake along a track through the printing press. The snake may have a ridge on one side, a ridge on each side, or may have more than one ridge on each side. The ridge includes intermittently spaced gaps, which provide flexibility to the body portion. The gaps are notches in the ridges, which are aligned with corresponding gaps on any opposite ridges so that the snake can easily flex and bend without compressing or placing in tension any of the ridges. The snake further includes a means for attaching the web to the snake. The means could be a brass grommet to which an end of the web is tied.

The present invention also includes a method for threading a web through a printing press using the snake of the present invention. In particular, the snake is used by attaching one end of the web to the snake, and inserting the front end of the snake into a track that extends through the press in the desired path. The ridges on the snake are fed into a ridge guide, formed as a part of the track. The snake is propelled along the track by powered driving members which have wheels to frictionally engage the snake. The web, attached to the snake, likewise advances along the desired track through the printing press.

DETAILED DESCRIPTION OF THE PREFERRED EMBODIMENTS

The preferred embodiment of the present invention is now described with reference to the figures where like reference numbers indicate identical or functionally similar elements. While the invention is described in terms of a specific embodiment, it should be understood that this is done for illustrative purposes only. A person skilled in the relevant art will recognize that various modifications, rearrangements and substitutions can be made without departing from the spirit of the invention.

Figure 1:
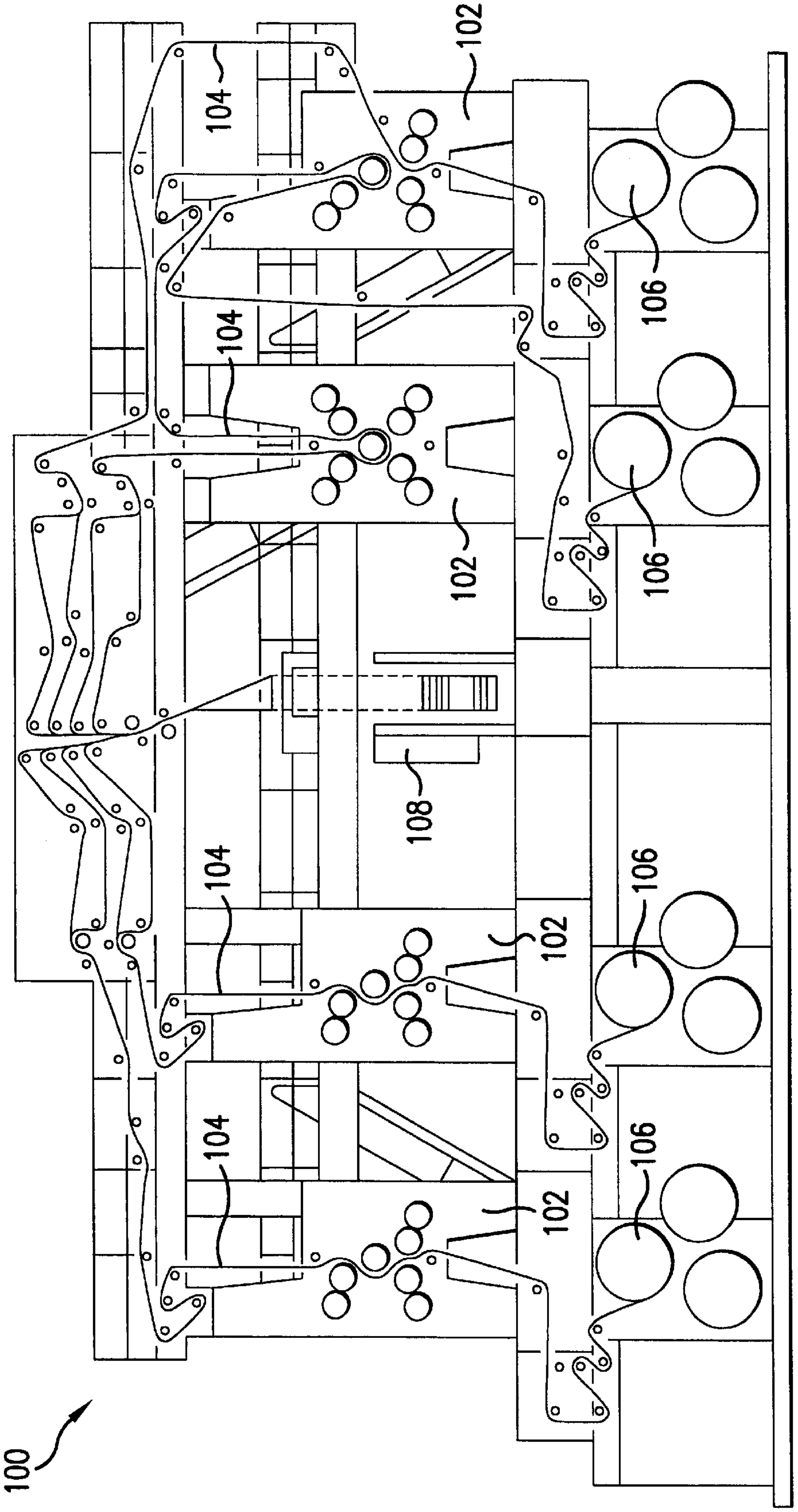
FIG. 1 is a schematic view of a rotary printing press.

FIG. 1 shows an example of a continuous web rotary offset printing press 100 in which many web paths are shown. The press 100 includes printing stations 102 that print on webs 104 supplied from supply web rolls 106. Webs 104 are guided over guide rollers and turn rods, (shown in further detail in FIG. 2), and, after suitable longitudinal slitting, guided to a folding arrangement 108. FIG. 1 shows an example of the circuitous route through which webs 104 are threaded in a modem printing press.

Figure 2:
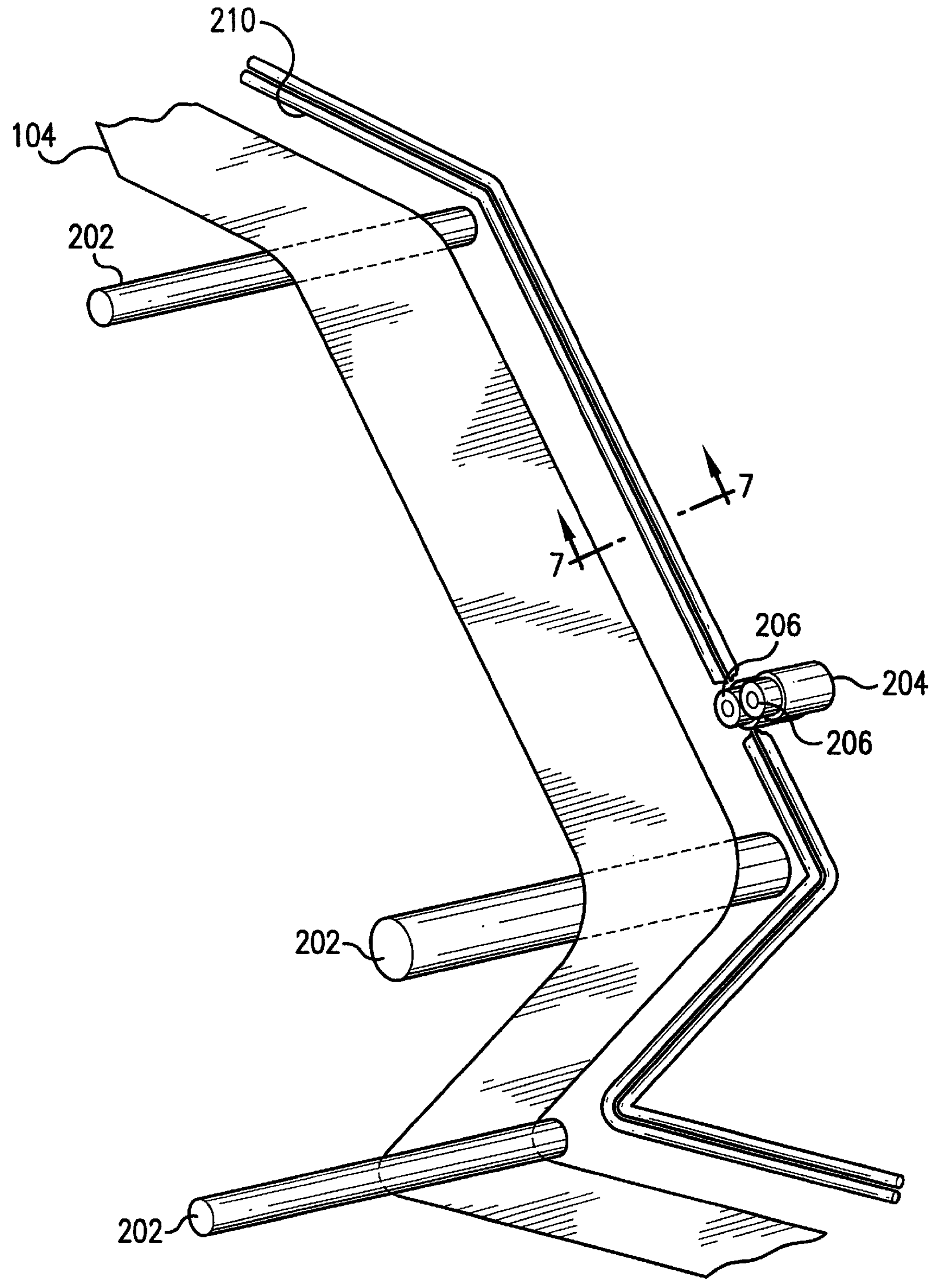
FIG. 2 is a schematic view of a web and track in a rotary printing press

FIG. 2 shows a more detailed view of one of webs 104 in printing press 100. Web 104 is threaded around guide rollers 202 and turning bars (not shown). Guide rollers 202 and turning bars enable a single length of web 104 to extend from web rolls 106 through all the necessary stations and areas of printing press 100. Alongside of web 104 is a track 210 for aiding in the threading of web 104 through printing press 100. Track 210 is attached to the frame of printing press 100 using any common brackets or fixtures (not shown). At predetermined distances along track 210, driving members 204 are located to rotate wheels 206 that frictionally engage and advance a threading apparatus (described below) in track 210.

Figure 3:
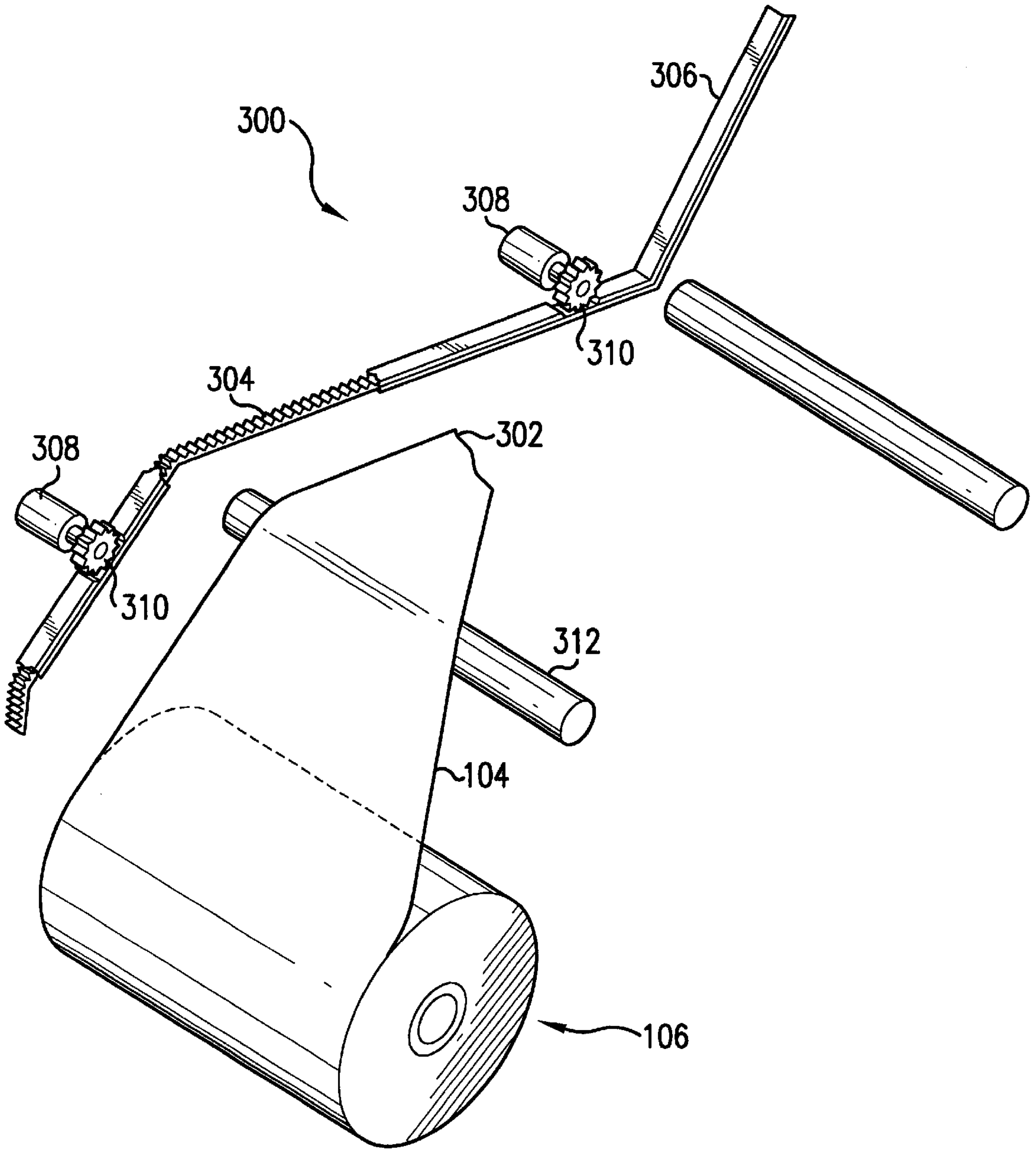
FIG.3 PRIOR ART
FIG. 3 is a view of a web being threaded through a conventional printing press.

An example of a web being fed into a conventional printing press 300 is shown in FIG. 3. As shown in FIG. 3, a leading edge 302 of web 104 is directly or indirectly connected to a web threading apparatus 304, commonly referred to as a snake. Snake 304 extends along a track 306 and pulls web 104 through printing press 300. In operation, edge 302 of web roll 106 is folded and supported by tape or other means commonly used in the art to form an angle or point. Edge 302 is attached to snake 304. Snake 304 is propelled along track 306 by driving members 308 having wheels 310, which in this case have sprockets that engage and grip snake 304. As snake 304 advances, web 104, which is connected to snake 304, is pulled around guide rollers 312 and turning bars through press 300. Once the threading is complete, edge 302 is disconnected from snake 304 and the printing press can begin printing operations.

Figure 4:
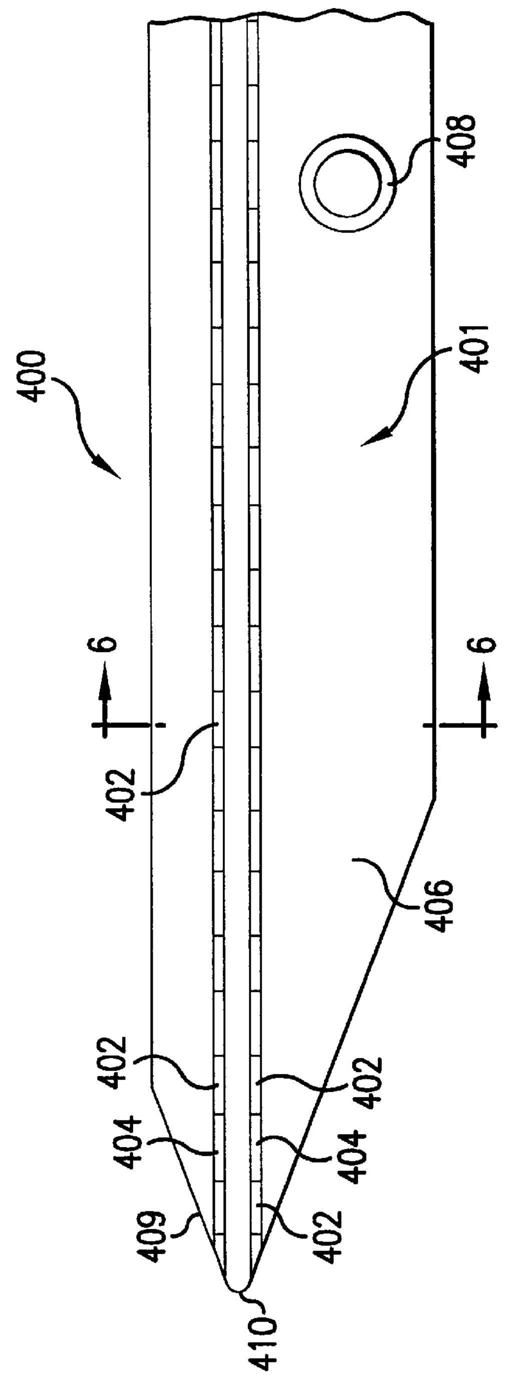
FIG. 4 is a top view of a snake used for threading a web.
Figure 6:
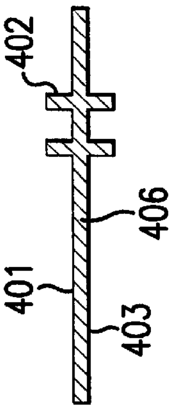
FIG. 6 is a cross-sectional view of a snake taken along a line 6—6 of FIG. 4.
Figure 5:
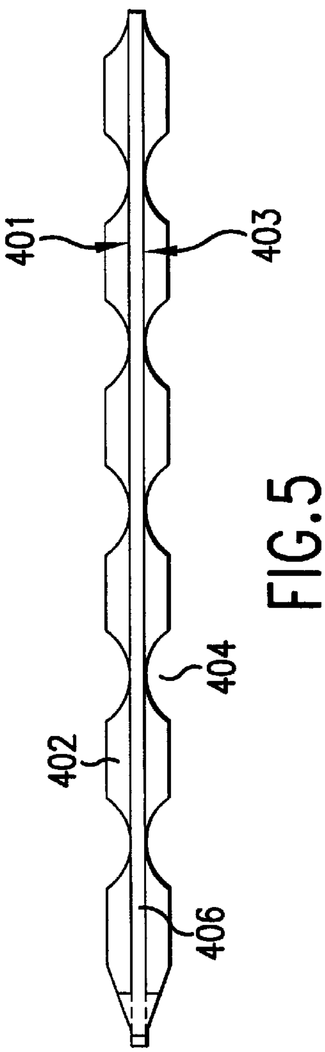
FIG. 5 is a side view of the snake of FIG. 4.

An embodiment of a snake 400 of the present invention is now explained with reference to FIGS. 4, 5 and 6. FIG. 4 shows a top view, FIG. 5 shows a side view and FIG. 6 shows a cross-sectional view of snake 400. Snake 400 is comprised of a body 406 having a first side 401 and a second side 403. Two parallel ridges 402 are disposed on each side 401 and 403 of body 406, and extend the length of body 406. Ridges 402 on the first side 401 of body 406 are aligned with ridges 402 on the second side 403 of body 406, as shown in FIG. 6. Although two ridges 402 are shown in this embodiment, it would be apparent to one skilled in the art that only one ridge, or more than two ridges could be used. As the important element is the strength of ridge 402, ridge 402 can be thick or thin, but preferably, when using two ridges, the ridges are about 0.04–0.06 inches thick.

It is necessary that snake 400 be quite flexible to travel the web path required by printing press 100. Snake 400 must be compliant enough to follow the tight turns and bends around guide rollers 202 and turning bars, as required of a web. Therefore, ridges 402 have gaps 404 located intermittently along the length of snake 400. Gaps 404 allow snake 400 to be easily flexed in two dimensions. As seen in FIG. 5, gaps 404 are U-shaped concavities in ridges 402. It would be apparent to one skilled in the relevant art that gaps 404 can be formed in a variety of shapes, including V-shape, squares, or any other shape that allows proper flexibility to be afforded to snake 400 as would be apparent to one skilled in the relevant art. Gaps 404 can be any distance apart, but must be close enough together to allow flexibility of snake 400. Gaps 404 are preferably between 0.5 inch and 1.5 inches apart. More preferably, gaps 404 are evenly spaced at about 0.75 inches apart. Furthermore, it is important that gaps 404 on both sides of body 406 be aligned so that snake 400 can flex without causing one ridge to be excessively compressed or pulled in tension while the other ridge properly flexes.

Body 400 must be rigid enough and strong enough to withstand the forces applied by driving members 204 and the opposing force applied by web 104 and web rolls 106. Snake 400 is also required to smoothly slide within track 210. Therefore, it is advantageous to have snake 400 manufactured of a low friction compliant material, such as ultra-high molecular weight polyethylene. This assists snake 400 in advancing through the track while minimizing any frictional binding that may occur as a result of the tight bends and turns in the track. Further, this material is rigid and strong enough to withstand the forces of the driving members 204. It would be apparent to one skilled in the relevant art(s) that other materials can be used to manufacture snake 400.

Body 406 has a leading edge 409, cut to a point 410, with the point being roughly in the area of ridges 402. Point 410 facilitates simple feeding of snake 400 into track 210 (described in more detail below). In a preferred embodiment, each end of body 406 includes point 410. This enables either end of snake 400 to be considered the front end or back end, simplifying use of snake 400 by allowing either end of snake 400 to be fed into track 210.

Figure 7:
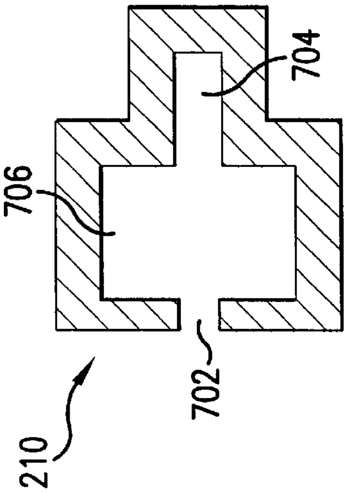
FIG. 7 is a cross-sectional view of a track used to guide a snake taken along a line 7—7 of FIG. 2.

Body 406 has a brass grommet 408 for attaching snake 400 to leading edge 302 of web roll 106. Grommet 408 is located about twenty-four inches from the trailing end of snake 400. Because either end of snake 400 can be the leading or the trailing end, grommet 408 is preferably at each end of snake 400. Leading edge 302 of web roll 106 is attached to grommet 408 using a ribbon, rope, wire, or a stiffened member directly connected to edge 302. It would be apparent to one skilled in the relevant art(s) that other means could be used in place of grommet 408 for attaching edge 302 of web roll 106 to snake 400. For example, other attachment means may include a brace, integral with and extending from body 406, a stiffened member attached to body 406, a hook, a string, a rivet, a bare hole, a slit, a force distributing device such as a triangular tab or any other component adapted to engage with or secure edge 302 of web roll 106 to snake FIG. 7 shows a cross-sectional view of track 210, taken along line 7—7 of FIG. 2. Track 210 is shaped to conform to the cross-section of snake 400 as shown in FIG. 6. Track 210 is generally T-shaped, having an opening 702 at one side through which snake body 406 can extend. Opposite the opening is a protrusion 704 which accommodates body 406. The walls of protrusion 704 limit the amount that body 406 can twist, tilt or wobble within track 210 during use. The top of the T-shape of track 210 is used as a ridge guide 706. Ridge guide 706 serves to hold snake 400 securely within track 210. This eliminates any chance of snake 400 inadvertently exiting opening 702.

In an embodiment of printing press 100, driving members 204 are located along track 210 at intervals of about 12 feet.

Therefore, to prevent snake 400 from becoming lodged in the track, it is preferred that snake 400 be about sixteen feet long, with grommet 408 located about two feet from the trailing end. By such a set-up, the length of snake 400 exceeds the distance between driving members 204 so that snake 400 is at all times engaged with at least one wheel 206. Further, at least one wheel 206, powered by driving member 204, is engaged with snake 400 forward of grommet 408, ensuring that web 104 advances through press 100 by being pulled, rather than pushed. This ensures that the opposing forces applied by driving members 204 and web 104 pull snake 400 in tension rather than compression, eliminating a chance of buckling and allows for smoother sliding through track 210.

Figure 8:
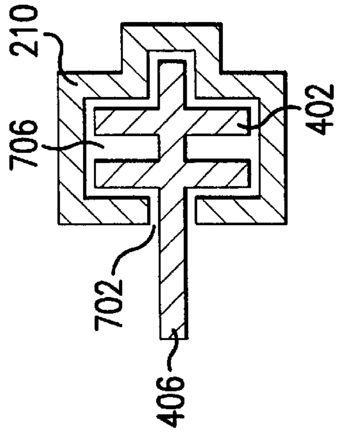
FIG. 8 is an endwise view of the snake of the present invention being used in conjunction with the track of FIG. 7.

FIG. 8 shows an end view of track 210 while engaged with snake 400. Both ridges 402 on each side of snake 400 are contained within ridge guide 706. Likewise, when only one ridge is used on each side of snake 400, the ridge will smoothly and easily fit within ridge guide 706. A portion of body 406 extends out of opening 702. This portion of snake 400 contacts wheels 206 of driving member 204. By frictionally gripping the exposed portion of snake body 406, wheels 206 advance snake 400 along track 210. The visible portion allows an easy determination of the location of snake 400 within track 210 and it allows access to snake 400 while feeding web 104 through press 100. Further, with body 406 being exposed in such a way, grommet 408, or any other web attachment apparatus, is easily and simply accessed.

The method of using snake 400 in press 100 to thread web 104 will now be described. Before beginning to thread web 104 through the press, it is necessary to prepare the leading edge for attachment to snake 400. FIG. 3 shows leading edge 302 properly prepared for threading. Edge 302 is folded and reinforced by tape or similar means. It is necessary to reinforce edge 302 to minimize tearing of web 104 from the effect of shear forces as edge 302 is pulled by snake 400, due to track 210 being located at the side of the web path. The angle or point distributes tensile forces generally in the direction of the length of web 104, reducing the web's inclination to tear. One method of reinforcing leading edge 302 is to secure a triangular Mylar tab (not shown) to the leading edge of web 104. Masking tape is angled from the edge of the Mylar tab across the width of web 104, and the web portion forward of the masking tape is torn off along the masking tape line. The Mylar tab includes a grommet or other device that enables a string to be tied to the leading point of the tab. One end of a string is tied through the grommet in the Mylar tab, while the other end of the string is tied through grommet 408 in snake 400.

The end of snake 400 that is not secured to the Mylar tab is fed into an end of track 210, taking care to ensure that ridges 402 are within ridge guides 706, as shown in FIG. 8. Snake 400 is manually advanced until the leading end engages wheels 206 of a first driving member 204. Wheels 206 grip snake 400 and automatically advance snake 400 as wheels 206 rotate. Snake 400 pulls leading edge 302 of web 104 through press 100. Naturally, the method steps can be performed with a number of variations. For example, an end of snake 400 could be fed into track 210 and partially advanced before connecting snake 400 to edge 302. Likewise, other methods can be used to connect web 302 to snake 400 or to reinforce edge 302.

Figure 9:
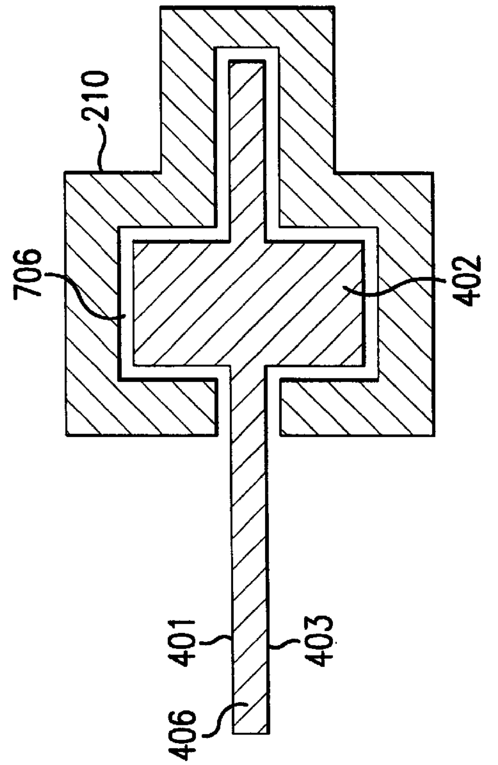
FIG. 9 is an endwise view of an alternate embodiment of the snake of the present invention being used in conjunction with a track.

FIG. 9 shows another embodiment of snake 400 in track 210. Only one ridge 402 is provided on each side 401 and 403 of snake body 406. Ridge 402 fits neatly within ridge guide 706 of track 210. Single ridge 402 is provided with gaps, as explained with reference to the previous embodiment. In this embodiment, ridge 402 is preferably about 0.2–0.3 inches thick.

Figure 10:
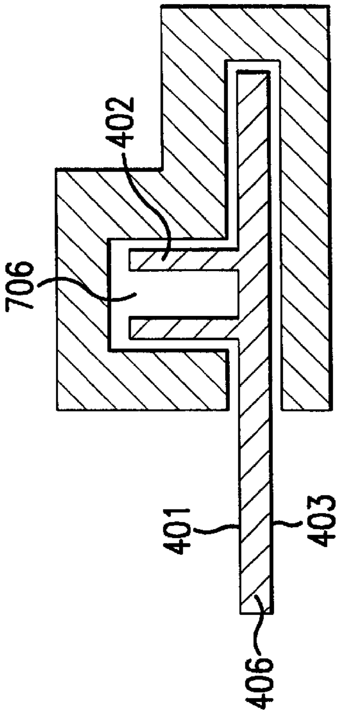
FIG. 10 is an endwise view of another alternate embodiment of the snake of the present invention being used in conjunction with a track.

FIG. 10 shows another embodiment of snake 400 used with a mating embodiment of track 210. Snake 400 has a ridge or ridges 402 on a first side 401 of body 406. In this embodiment, second side 403 of body 406 has no ridge.

One method of manufacturing snake 400 is to extrude body 406 and ridges 402 in a single continuous length. Gaps 404 are formed in ridges 402 using a gang punch, a stamping tool, a notching machine or any other common tool or machine known in the art of notching. A grommet is manually attached using a hammer and grommet tools.

While the invention has been particularly shown and described with reference to preferred embodiments thereof, it will be understood by those skilled in the art that various changes in form and detail may be made therein without departing from the spirit and scope of the invention.

What is claimed is:

1. An apparatus for threading a web through a printing press, comprising:

a body portion having a length and a width; and at least one ridge integrally formed on at least one surface of said body portion, said at least one ridge extending along the length of said body portion, wherein said at least one ridge includes intermittent gaps affording flexibility to said body portion.

2. The apparatus of claim 1, wherein the apparatus further comprises means for connecting said body portion to the web.

3. The apparatus of claim 2 wherein said means is a brass grommet.

4. The apparatus of claim 1, wherein said at least one ridge is configured to engage and guide the apparatus along a track of the printing press.

5. The apparatus of claim 1, wherein the apparatus includes two ridges, one on each side of said body portion.

6. The apparatus of claim 1, wherein the apparatus includes two parallel ridges on each side of said body portion.

7. The apparatus of claim 6, wherein said gaps along said parallel ridges are aligned.

8. The apparatus of claim 6, wherein said parallel ridges have a thickness between 0.05 and 0.25 inch.

9. The apparatus of claim 1, wherein said gaps are evenly spaced 0.75 inch apart.

10. The apparatus of claim 1, wherein said gaps are concavities in said ridges.

11. The apparatus of claim 1, wherein the apparatus is made using ultra-high molecular weight polyethylene.

12. The apparatus of claim 1, wherein at least one end of said body portion is angled to a point.

13. The apparatus of claim 1, wherein said body portion is at least 16 feet long.

14. A method for threading a web through a printing press, comprising:

attaching the web to a threading apparatus, wherein said apparatus includes, a body portion having a length and a width, and at least one ridge integrally formed on at least one surface of said body portion, said at least one ridge extending along the length of said body portion, wherein said at least one ridge includes intermittent gaps affording flexibility to said body portion; and feeding said first end of said apparatus into a track on the printing press.

15. The method of claim 14, wherein the apparatus further comprises means for connecting said body portion to the web.

16. The method of claim 15, wherein said means is a brass grommet.

17. The method of claim 14, wherein said at least one ridge is configured to engage and guide the apparatus along a track of the printing press.

18. The method of claim 14, wherein the apparatus includes two ridges, one on each side of said body portion.

19. The method of claim 14, wherein the apparatus includes two parallel ridges on each side of said body portion.

20. The method of claim 19, wherein said parallel ridges have a thickness between 0.05 and 0.25 inch.

* * * * *